Dec. 12, 1933.                H. SEBELL                1,938,935
CONTAINER
Filed April 2, 1932
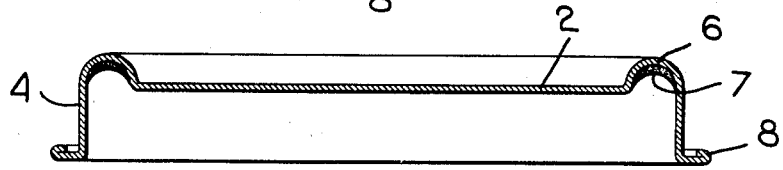
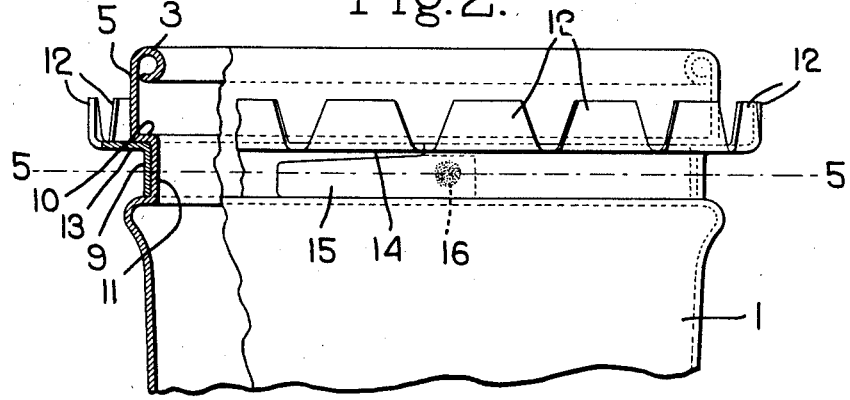
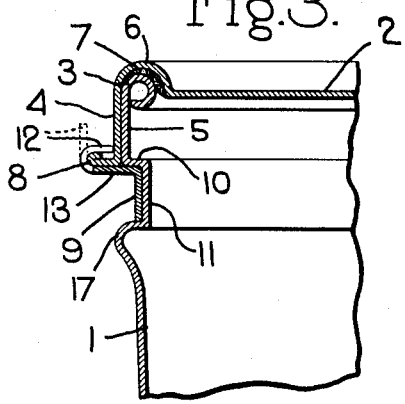 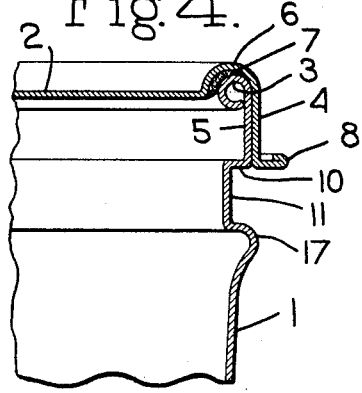
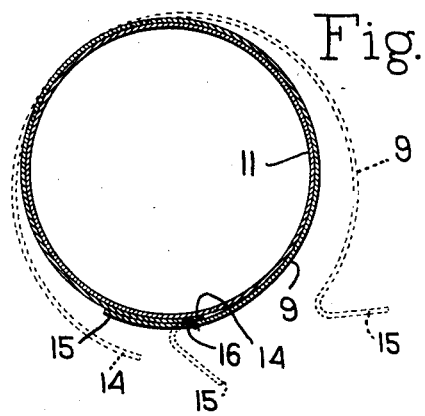
Inventor.
Harry Sebell
by Heard Smith & Tennant.
Attys.

Patented Dec. 12, 1933

1,938,935

UNITED STATES PATENT OFFICE 1,938,935

CONTAINER

Harry Sebell, Boston, Mass., assignor to Arthur H. Parker, Lexington, Mass.

Application April 2, 1932. Serial No. 602,752

8 Claims. (Cl. 220—61)

This invention relates to a container in the nature of a can, pail or the like, which is constructed to be closed by a so-called "slip-on" cover, that is, a cover which has a skirt portion fitting around the top of the container body with a friction fit. The invention relates particularly to a container having a slip-on cover which is provided with an outwardly-extending flange at the lower part of the skirt and one object of the invention is to provide a novel means for holding the cover to the container body which will prevent the cover from becoming loosened even if the flange of the cover receives blows or is hit by any object during transportation in such a way as would tend to loosen the cover.

A further object of the invention is to provide a novel means for holding a cover of this type to a container which is constructed to facilitate the removal of the cover when it is desired to open the container.

In accordance with my invention the cover is held in closed relation by a cover-retaining ring which surrounds the container body and which is provided with a plurality of fingers that are bent over a peripheral flange with which the skirt of the cover is provided. The cover-retaining ring is readily disruptable at one point so that when the container is to be opened the ring is disrupted at said point and is then removable from the container body and cover after which the cover can be readily pried off from the container body.

In order to give an understanding of the invention I have illustrated in the drawing a selected embodiment thereof which will now be described after which the novel features will be pointed out in the appended claims.

Fig. 1 is a sectional view of the cover for a container embodying my invention;

Fig. 2 is a side view of a container embodying my invention with a part broken out;

Fig. 3 is a fragmentary sectional view showing the cover locked to the container;

Fig. 4 is a fragmentary sectional view showing the cover-retaining ring removed but the cover still in place on the container;

Fig. 5 is a sectional view on a reduced scale on the line 5—5, Fig. 2.

In the drawing, 1 indicates the body of a container which may be in the form of a can or a pail or any other similar container, and 2 is the cover for closing the open end of the container. The container is shown as formed with a bead 3 around its upper edge which is formed by curling the edge of the container body inwardly and the cover is of the "slip-on" type, that is, it is provided with a skirt portion 4 adapted to embrace and have a frictional fit with the upper portion 5 of the container body. The cover is also shown as being formed with a bead-receiving groove 6 which receives the bead 3 of the container body when the cover is applied and for making a tight joint a layer of sealing compound 7 will be employed which lies between the bottom of the groove 6 and the bead 3. The cover is further provided with an annular outwardly-directed flange 8 which is shown as situated at the lower edge of the skirt 4.

The cover 2 is retained in place on the container body by means of a closed cover-retaining ring which surrounds the container body adjacent the top and is held from upward movement and which is also provided with a plurality of fingers that are adapted to be bent over and embrace the flange 8. Said cover-retaining ring is shown at 9 and it is held from upward movement relative to the container body by engagement with a downwardly-facing annular shoulder 10 with which the container body is provided. This retaining ring 9 underlies the shoulder 10 and embraces the portion 11 of the container body directly below the shoulder, which portion has a smaller diameter than the portion 5 above the shoulder.

This cover-retaining ring is also provided with a plurality of fingers 12 which normally are directed upwardly but which are adapted to be bent over the flange 8 of the cover as shown in Fig. 3.

The ring 9 is applied to the container body while the latter is being made and before the cover is sealed to the body and said ring 9 has such shape that when it is placed around the body the upstanding fingers 12 will be spaced from the portion 5 of the container body a sufficient distance to receive the flange 8 so that when the cover 2 is placed on the container body as shown in Fig. 3, the flange 8 will pass down between the portion 5 of the body and the upstanding fingers 12. After the cover is in sealing relation to the container body then these fingers 12 are bent over the flange as shown in full lines Fig. 3 thereby locking the cover in place.

In the preferred embodiment of the invention the ring 9 is formed with the portion 13 which extends outward laterally and the fingers 12 rise from the outer edge of this portion 13.

The closed ring 9 is not permanently secured to the can body but merely surrounds the can body with a more or less loose fit. Said ring is so made that it is readily disruptable at some point and the opening of the container involves the operation of breaking or disrupting the ring at its readily-disruptable point after which the ring can be readily removed from the container or will by its own resiliency spring off from the flange 8 thus permitting the cover to be removed.

One simple way of providing a cover-retaining ring which is thus readily disruptable at one point is to make the ring from a strip of metal of proper shape and of such a length that when the strip is placed around the container to form the ring the ends 14 and 15 of the strip will have an overlapping relation and then soldering these two overlapping ends together at some point as indicated at 16.

The portion 15 of the ring at one end which overlaps the portion 14 is not provided with any fingers 12 and said portion 15 thus constitutes a tab which can be readily manipulated to disrupt the ring. This disrupting can be accomplished by grasping the end 15 of the ring with pliers or some suitable tool and applying a pulling force thereon. A sharp jerk or quick force applied will readily break the soldered connection at 16 thus disrupting the ring 9 and as this is done the ring can be readily removed from the can without loosening the bent fingers 12 from the flange 8. In fact, a natural resiliency of the ring may be sufficient so that when the ring is disrupted it will spring off from the flange as shown in dotted lines Fig. 5.

As soon as the cover-retaining ring 9 has been thus removed then the cover 2 can be pried or forced off from the container body in any usual way. Where the container is one which is formed with a bead 17 below the portion 11 which is surrounded by the cover-retaining ring 9 then it may be possible to introduce a tool between the bead of the container body and the flange 8 of the cover and exert a prying force which will raise and loosen the cover so that it can be removed.

The construction of the cover-retaining ring 9 with the portion of considerable vertical dimension which encircles the portion 11 of the container and the engagement of the ring with the under side of the shoulder 10 provides a construction which is well adapted to resist any force applied to the flange 8 of the cover tending to raise or loosen the cover. When a sealed container of this type is being shipped there is always the possibility that during transportation the flange 8 of the cover may receive a blow in a direction tending to lift or loosen the cover.

With the construction herein shown, however, the shape of the retaining ring and its engagement with the shoulder 10 of the body tend to resist any such force so that the container embodying this invention can be transported freely without danger that the cover will be loosened during transportation.

While I have illustrated a selected embodiment of the invention I do not wish to be limited to the constructional features shown.

I claim:

1. A container comprising a container body, a cover having a skirt portion encircling the top portion of the container body, said cover having a flange extending outwardly from the skirt portion, a closed cover-retaining ring surrounding the body and having upwardly-directed fingers which are bent over the flange of the cover, said ring and container body having complemental shapes to prevent the ring from upward movement on the body, and said ring being readily disruptable at one point and when disrupted being readily separable from the container body thereby permitting the cover to be removed.

2. A container comprising a container body having a downwardly-facing shoulder near its open end, a cover for said container, said cover having a skirt portion which encloses the upper end of the container body above the shoulder and also having a flange extending outwardly from the skirt, a closed cover-retaining ring loosely surrounding the container body below the shoulder and having upwardly-extending fingers adapted to be bent over said flange, said ring being readily disruptable at one point.

3. A container comprising a container body having a downwardly-facing shoulder near its open end, a cover for said container, said cover having a skirt portion which encloses the upper end of the container body above the shoulder and also having a flange extending outwardly from the skirt, a closed cover-retaining ring loosely surrounding the container body below the shoulder and having upwardly-extending fingers adapted to be bent over said flange, said ring being readily disruptable at one point, and when disrupted being readily removable from the container body.

4. A container comprising a container body having a downwardly-facing shoulder near its open end, a cover for said container having a skirt portion which encloses the top of the container body above the shoulder and also having a flange extending outwardly from the skirt, a cover-retaining member in the form of a strip of metal surrounding the container body below said shoulder and having its ends overlap and soldered together at one point thereby forming a closed ring, said strip having upwardly-extending fingers adapted to be bent over the flange of the cover.

5. A container comprising a container body having below its upper end an exterior downwardly-facing shoulder, a cover member having a skirt portion encircling and tightly fitting that portion of the container body above the shoulder and also having a flange extending outwardly from the lower end of the skirt, a closed cover-retaining ring surrounding the container body below the shoulder and engaging the latter, said ring being formed of resilient material, being readily disruptable at one point, and having upwardly-extending fingers adapted to be bent over said flange.

6. A container comprising a container body having an exterior downwardly-facing shoulder below its open end, a cover for said container, said cover having a skirt portion which encloses and fits the portion of the container body above the shoulder and is provided with an outwardly-extending flange at its lower edge, a closed cover-retaining ring presenting a cylindrical portion encircling the container body below the shoulder, and an outwardly-extending portion underlying the shoulder and said flange, the edge of said outwardly-extending portion presenting fingers adapted to be bent over the flange, said ring being readily disruptable at one point.

7. A container comprising a container body having an exterior downwardly-facing shoulder below its open end, a closed cover-retaining ring encircling the body below the shoulder, said ring presenting upwardly-directed fingers which are situated outside of and are spaced from the portion of the container body above said shoulder, said fingers being adapted to be bent over the flange on the skirt of a cover which is applied to the container body.

8. A container, a cover therefor, and a cover-retaining ring assembly comprising a container body open at one end, a cover-retaining ring loosely surrounding the container body below the open end, said container body and ring having complemental shapes to prevent the ring from moving toward or from the open end of the container, and said ring presenting on its periphery a plurality of upstanding fingers which are situated outside of the container body and are spaced therefrom and which are adapted to be bent over the flange of a cover that is subsequently applied to the container.

HARRY SEBELL.